United States Patent

Land

[15] 3,655,277
[45] Apr. 11, 1972

[54] MOTION-PICTURE SYSTEM
[72] Inventor: Edwin H. Land, Cambridge, Mass.
[73] Assignee: Polaroid Corporation, Cambridge, Mass.
[22] Filed: June 20, 1968
[21] Appl. No.: 738,464

[52] U.S. Cl.....................352/72, 352/78, 352/104, 95/13
[51] Int. Cl..........................................G03b 23/02
[58] Field of Search.................352/72, 78, 104; 95/13, 14, 95/89; 250/66; 212/71.2

[56] References Cited

UNITED STATES PATENTS

| | | | |
|---|---|---|---|
| 3,041,952 | 6/1962 | Schreck | 95/14 |
| 3,383,998 | 5/1968 | Takats | 95/90.5 |
| 1,771,651 | 6/1930 | Newman | 352/78 |
| 3,097,584 | 7/1963 | Wright | 95/14 X |
| 3,157,882 | 11/1964 | Barnett | 352/72 |
| 3,181,444 | 5/1965 | Takats et al | 95/14 X |

*Primary Examiner*—John M. Horan
*Assistant Examiner*—Alan Mathews
*Attorney*—Brown and Mikulka

[57] ABSTRACT

Motion-picture apparatus for exposing a motion-picture film especially adapted to a diffusion transfer method of image formation; for rapidly processing the exposed film; and for immediately thereafter projecting the film in the form of a finished motion-picture sequence. The system includes, for an improved operation, a unique multi-purpose cassette or magazine usable both in a camera component for the taking function and in a projection component for processing and projection purposes.

The camera component of the system, adapted to use the aforesaid motion-picture film and cassette, may, appropriately, be of a type also capable of accepting a standard motion-picture film such, for example, as one having the physical characteristics of a so-called "Super-8" film, sold by Eastman Kodak Co., Rochester, New York, U.S.A. The camera may, therefore, be of a substantially conventional type with the qualification that it need be adapted to mount the cassette of the invention and optically suited to utilize the film contained therein.

The projection or viewing component of the system may, suitably, be in the form of a compact cabinet-type unit incorporating a viewing screen comparable in area to that of a television receiver. Such a unit is primarily intended as a home entertainment device but, alternatively, its use may be extended to scientific or other fields where an immediate showing is of advantage following the taking of a motion-picture. The viewing component may also be used for accommodating standard motion-picture film.

6 Claims, 15 Drawing Figures

PATENTED APR 11 1972          3,655,277

INVENTOR.
Edwin H. Land
BY
Brown and Mikulka
ATTORNEYS

MOTION-PICTURE SYSTEM

Although a certain degree of recognition has previously been given to the possibility of rapidly processing and viewing an exposed motion-picture film, no practical system is known to have evolved therefrom. At least no such system has as yet been made available in a form adapted to public usage. Included in the art relating to the subject may be listed u. S. Pat. Nos. 2,780,972, 2,880,657, 2,930,302, 2,971,445, 3,003,871 and 3,237,541. In general, a complexity of apparatus appears to pervade the art which complexity is unsuited to cost, appearance and operational simplicity limitations considered of importance herein.

The current trend in non-professional or so-called "home-movie" picture taking is to employ a cassette holding a supply of motion-picture film which can easily and quickly be mounted in a camera and which, when thus mounted, provides, automatically, that the film is correctly threaded and ready for "shooting." After exposure of a complete length of film, the cassette, customarily, is removed from the camera and forwarded to a remote processing station, as by postal means, for accomplishing its processing. The processed film is then returned on a spool or in a second cassette ready for projection. The projector usually includes means for readily mounting the spool or second cassette and for automatically threading the film.

The system of the present invention provides all of the operational advantages, above described, of rapid mounting, self threading, and rapid removal of motion-picture film relative to both camera and projector components. However, it utilizes but a single film-containing cassette or magazine adapted to mounting in both the camera and the projector for performing the taking and viewing steps. And it eliminates the delay, usually measured in days, which is conventionally required to process a motion-picture film after its exposure. The present system permits the viewing of a completely processed motion-picture film within a matter of seconds after taking it. It also makes possible the viewing of extensive film footage immediately upon returning from a protracted period of picture taking.

In accordance with the foregoing considerations, objects of the invention are to provide a novel motion-picture system comprising apparatus in which a given length of photosensitive film material is exposed, rapidly processed and rendered viewable, in terms of magnified images, on a viewing surface; to provide a system of the character described wherein are included camera, projector, viewing-screen and cassette components, the cassette embodying film-supply and takeup means and being usable and interchangeably mountable in both the camera and the projector components for taking and for processing-and-projection functions, respectively; to provide a system, as stated, wherein processing means are incorporated with the cassette; to provide a system, as characterized, in which the supply and takeup means of the cassette are in the form of rotatable spools or reels powered by cooperative means of the camera and projector components, respectively; to provide a system of the type set forth wherein the cassette, exclusive of driving means, is substantially self-contained when employed for exposure purposes in the camera component and, when employed in the projector component, is substantially self-contained, exclusive of driving means, for processing purposes and adapted to cooperate with self-threading and related means of the projector component for projection and viewing purposes; to provide a novel cassette of the category stated wherein supply and takeup means are adapted to film advancement and rewind operations therewithin; to provide a system of the character described which is capable of utilizing black-and-white and color film materials adapted to rapid processing; to provide a system, as detailed, wherein the cassette is usable in a camera component, the camera being adapted to accept a conventional cassette and motion-picture film and wherein the projector component is also adapted to accept a conventional cassette and motion-picture film; to provide a system of the character described, wherein the cassette and projector components operate cooperatively to enable a substantially automatic performance of processing, projection and rewind operations; to provide a system of the category stated wherein the processing, projection and viewing components are incorporated in a compact cabinet-type unit suitable for home use; and to provide apparatus for the purposes set forth which is relatively simple in structure and positive in operation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

FOr a fuller understanding of the nature and objects of the invention, reference should be had to the following detailed description taken in connection with the accompanying drawings wherein:

In FIG. 2 the film is undergoing rewinding; in FIG. 3 threading; in FIG. 4 projection and in FIG. 5 rewinding onto a storage reel;

Figure 1:
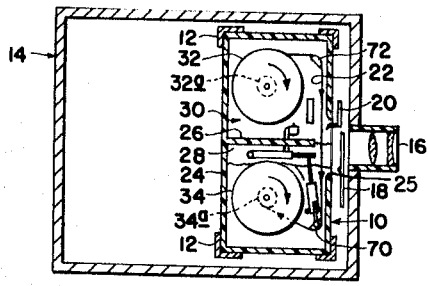
FIG. 1 is a diagrammatic side-elevation view, partly in cross-section of the principal cassette or cartridge of the invention mounted in the camera component of the system. A motion-picture film is undergoing exposure.

Referring now to the drawings, FIGS. 1 through 8 and 12 through 15 illustrate apparatus of the system at various stages of operation. These include photographically exposing, processing and projecting the film together with various supplemental operations relating to automatic stopping, rewind, etc.

In FIG. 1 the cassette or cartridge 10 is mounted in retaining means 12 of a camera 14. The camera includes an objective 16, a shutter 18 and an intermittent movement, for example, of a claw type indicated at 20, adapted to engage sprocket holes of the film 22. Other structure of the camera, not shown, may be considered as of a generally conventional nature, its controls being used relative to film movement.

Figure 10:
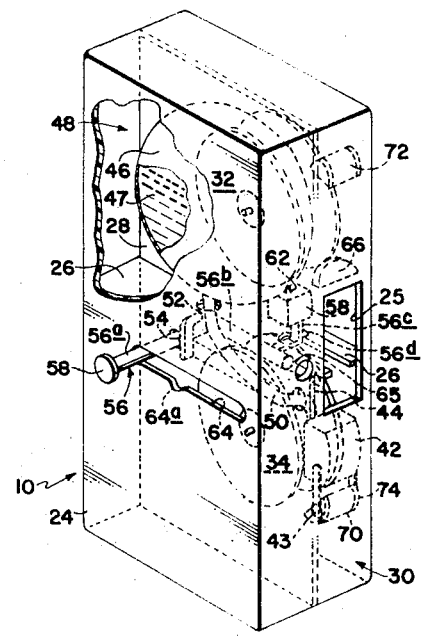
FIG. 10 is a diagrammatic perspective view further illustrating structure of the principal cassette of the invention.
Figure 11:
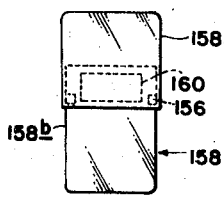
FIG. 11 is a diagrammatic end view of a secondary or storage cassette of the invention.

The cassette 10, shown in detail in FIG. 10, includes a housing 24 preferably formed of a plastic such as a polystyrene, an acrylic, or another suitable material. The housing is internally sectioned at approximate mid-points by horizontal and vertical partitions or webs 26 and 28, respectively, at a 90° relation. Within the housing section 30 formed by web 26, namely, the far or remote housing section as seen in FIGS. 1 through 5, the film supply spool or reel 32 and the film takeup reel 34 are mounted for rotation by driving means of the camera such as spindles, not shown, having key means at their extremities adapted to engage slots 36 formed in the hubs 32a and 34a. The reels may, appropriately, be formed of a plastic material such as an acetal.

As shown in FIG. 1, the film 22 is undergoing sequential exposure through its movement from the supply reel 32 to the takeup reel 34. In this connection, the cassette housing 24 is provided with an opening or film gate 25 across which the film 22 is progressively transported as it is coiled onto the takeup reel or spool 34. Thus, this opening or film gate 25 provides the cassette 10 with an exposure station such that incremental sections of the film 22 may be progressively exposed to image-carrying light rays as it is advanced from the cassette's supply spool 32 to its takeup spool 34. Other components of the cassette 10 are identified with processing and projection of film 22 and will be described in connection therewith. The dimensions of the cassette 10 are to be considered as merely illustrative and may be modified as, for example, to a less elongated shape to conform more closely to those of a presently commercially distributed camera cassette whereby the cassette 10 may be readily interchanged therewith. Although the reels 32 and 34 are shown as of a given conformation they may, alternatively, be merely of the diameter of their hubs, wall portions of the cassette in slidable contact with the film serving to insure proper coiling and uncoiling thereof.

Figure 2:
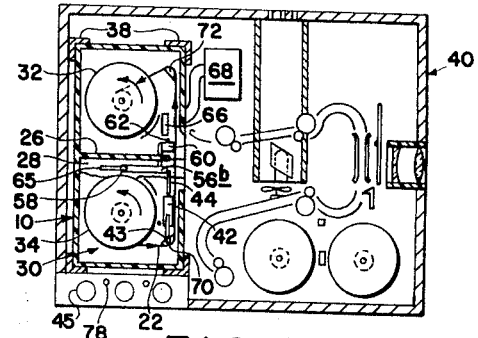
FIGS. 2 through 7 are diagrammatic side-elevation views, partly in cross-section, of the principal cassette mounted in the projector component for processing and projection purposes.

In FIG. 2, the cassette 10, with film 22 completely wound on the takeup reel 34, has been removed from camera component 14 of the system and mounted in retaining means 38 of a projector component 40 thereof. The exposed film 22 is undergoing rewinding movement from the takeup reel or spool 34 to the supply reel 32. Concurrently, it is being processed by subjection to a processing liquid. The processing liquid is applied to the inner or emulsion side of the film from a liquid-impregnated applicator pad 42, pivotally mounted at 43. The pad is brought into contact with the film emulsion by a mechanical force applied to a resilient spring-like appendage or contactor 44. The pad is thus pivoted into contact with the film. The rewind circuit is energized by control knob 45.

As illustrated in FIG. 10, the processing liquid 47 is releasably held in a container, e.g., in a flexible sac 46 composed of polyethylene or another suitable material, rigid or flexible, and is positioned in the upper section or compartment 48 which is nearest to the viewer in FIG. 10 and which would be nearest to the viewer if it were shown in FIGS. 1-7. A tube 50 connects the sac 46 and pad 42. Flow and cutoff of the liquid is controlled by a valve 52 actuated by a lever 54. The lever 54 and pad 42 are motivated by slidable linear movement of the plural-armed, multi-actuating element 56 which includes the lateral handle portion 56a adapted to contact and move the lever 54 and terminates in an actuating knob 58. The element 56 also includes the portion 56b at 90° to the portion 56a and adapted to actuate the contactor 44 for moving the pad 42, the angled laterally and upwardly extending inner arm portion 56c, and the lug portion 56d slidably contacting the surface of web 26. At the extremity of the portion 56c, a combined pad 60 and projecting film-advancing tooth 62, to be further described, are mounted.

The multi-purpose actuating element 56 is adapted to backward and forward movement responsive to a motivating force manually applied to the knob 58. Its correct position is assured through slidable mounting of the element in the elongated slots 64 and 65 and the aforesaid contact of the angled arm portion 56d with the horizontal web 26. A first position of the knob 58 is established at the slightly recessed or indented slot portion 64a; a second position at the forward extremity of the slot 64. The terms "front" and "rear" or "forward" and "rearward" etc., are employed herein to designate a relation to the front and rear of the camera and projector components.

Upon contact with the pad 42, liquid permeation and processing of the film emulsion is immediately initiated. The second pad 60, also brought into contact with the film emulsion by the aforesaid movement of the knob 58 to the first position at 64a, serves to at least partially remove any excess of the processing liquid remaining on the film surface. The vent 66, supplied with forced heated air from the heater-and-fan element 68, further reduces surface moisture. The heater element 68 is also energized by switch means actuated by control knob 45. The film, having traversed the guide members 70 and 72 during its travel, then passes to the supply reel 32, bearing an image adapted to subsequent projection.

Thus it will be seen that, in the illustrated embodiment, the cassette 10 includes a film gate 25 defining an exposure station, a film processing station intermediate the film gate 25 and the takeup spool 34 and a film drying station intermediate the film gate 25 and the supply spool 32.

Figure 3:
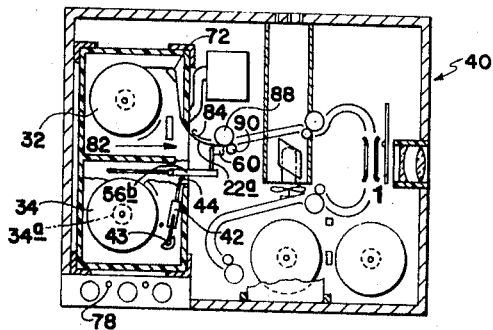

In FIG. 3, the trailing end-portion 22a of the film has been uncoiled and separated from the hub 34a. With cessation of a tautened condition of the film 22, the pad 42, under bias applied by the spring-like contactor 44 against the actuator portion 56b, has been rotated clockwise to the limit shown, provided by its contact with the cassette housing. A weaker torsion spring 74 normally biases the pad in an opposite direction to the position shown in FIG. 1. With the pad 42 at the position of FIG. 3, a microswitch enclosed within the guide member 70 and having an actuating member connected to pivot 43 has assumed an "off" position, whereby the reel 32, driven by the projector spindle 76, has stopped rotating, and a green indicator light 78 has been energized. In this regard, it is to be understood that in mounting the cassette 10 in the projector component suitable plug and jack means 80 have introduced the microswitch of guide member 70 into the projector rewind circuit which drives reel 32. Simultaneously, the heater-and-fan element 68 has been turned off. In conjunction with the foregoing operations, it is to be understood that the reels 32 and 34 of the cassette embody clutch means or the like whereby each is adapted to be rotated by camera or projector mechanism in one direction and to rotate freely in an opposite direction. As illustrated, reel 32 is subject to being driven in a counterclockwise direction and reel 34 in a clockwise direction.

Upon separation of the film from hub 34a and cessation of rotation of reel 32, as indicated by the green light 78, the trailing end-portion 22a of the film is of a given length, its extremity extending slightly into the opening of the cassette aperture 82 and in line with the pad 60. Knob 58 is then manually pushed to its extreme forward position. Coincidentally, the pad 60, in cooperation with guide 84, engages the film end-portion 22a and the tooth 62 enters a sprocket hole 86. The extremity of the film, now constituting a leader, is thus threaded within the bite of the friction drive roller 88 and pad roller 90. The film is now ready for projection, illustrated in FIG. 4.

The projector component of the system, in addition to driving means for the reel 32 and the heater 68, previously mentioned, comprises a projection lamp 92, semi-enclosed by a heat-shield 94, a reflector 96, a condenser 98, and a mirror 100 disposed at approximately 45° to the optical axis. The reflector 96 may, of course, be enclosed within the lamp envelope. The offset relation of the lamp to the optical axis of the objective 102 and inclusion of the mirror 100 are for the purpose of permitting a convenient arrangement of film travel and avoiding an undue subjection of the film to heat. A rearrangement of these elements will be understood to be possible within the scope of the invention.

A self-threading advancement and controlled direction of movement of the film 22 for projection is accomplished by the following elements which comprise: the powered sprockets 104 and 106, an intermittent movement exemplified by the claw 108, a friction drive roller 110, the pad rollers 112, 114 and 116, a takeup reel 118, the gate elements 120 and the guide means 122. A shutter 124 is located at the gate. Advancement and takeup of the film 22, energization of the lamp 100, and rotation of the shutter 124 are initiated by the control knob 126.

The leading end of the film passes between the drive roller 110 and pad roller 116 at an acute angle relative to the horizontal such that it is elevated slightly above the hub 128a of the reel 128. As the leading portion 22a of the film increases in length, its increased weight causes it to come into slidable contact with the hub 128a and its foremost end to be lowered into contact with the hub 118a of the takeup reel 118. To facilitate the latter contact, a rigid, "featherweight" strip element 130 composed, for example, of a plastic or magnesium may, optionally, be pivotally mounted at 132 so as to provide a V for guiding the film extremity. Thereafter, the element 130, preferably having slightly raised or beaded longitudinal marginal portions, may ride lightly on the marginal portions of the film.

Figure 8:
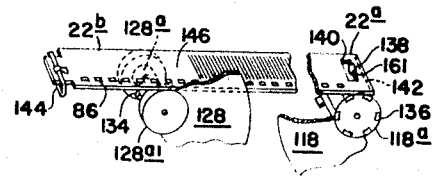
FIG. 8 is a diagrammatic, fragmentary perspective view of the film showing complementary self-threading means for accomplishing its advancement onto a takeup reel and its rewinding onto a storage reel.
Figure 9:
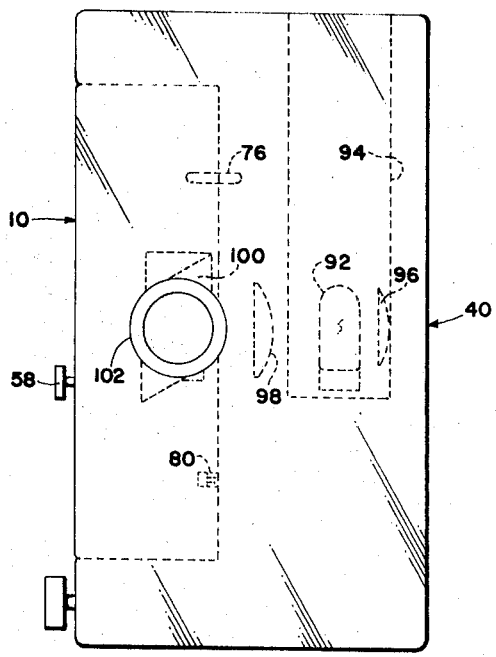
FIG. 9 is a diagrammatic front view of the projector component illustrating an offset relation of illuminating lamp and optical components thereof.

As illustrated in FIG. 8, the hub 128a includes flanged end portions 128a[1] to enhance slidable movement of the film thereacross and prevent scratching of its image areas. The central portion of hub 128a, of a reduced diameter, includes a plurality of slightly overturned hooked members 134 distributed around its periphery, their extremities extending in a counterclockwise direction. The hub 118a includes a plurality of small permanent bar magnets 136 inset around its periphery. Therebetween, at central portions, it includes a plurality of slightly overturned hooked members 138, extending in a clockwise direction. The central portion of the film includes a slot or aperture 140, adapted to be engaged by one of the hooks 138. At the tip of the film, an underlying transverse portion or strip 142 has a coating of a magnetizable material formed thereon, e.g., a plurality of minute iron particles dispersed in a plastic material. A bar magnet 136, attracting the strip 142, is adapted to facilitate engagement of the film by a hook 138 of the rotating hub 118a.

When the trailing portion 22b of the film arrives at the hub 128a, a pivotally-mounted loop 144 at the end of the film, composed of a metal or a plastic material is adapted to engage one of the hooked members 134. Simultaneously, a clear portion 146 of the film is positioned in the optical path of a beam from a light source 148 to a photoelectric cell 150. Responsive to energization of the photoelectric cell, switching means, not shown, is actuated to stop rotation of the takeup reel 118 and to energize the red lamp 152.

Figure 5:
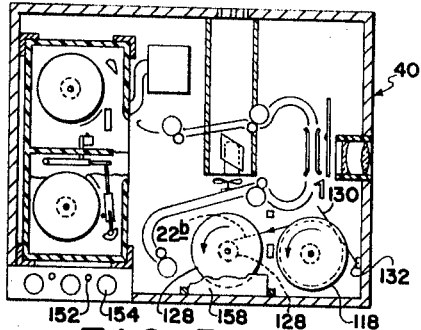

In FIG. 5, the film has been completely wound on the takeup reel 118, its trailing end being fastened to reel 128, which may be designated a storage or "film library" reel, by the engagement of loop 144 with hook 134, as previously explained. Control knob 154 is now turned to actuate switch means for initiating counterclockwise rotation of the reel 128 while, at the same time breaking the circuits of the lamp, shutter and film-advancing elements, those controlling movement of the sprockets, drive rollers and intermittent and that of the red lamp 152. The storage reel 128 may, to advantage, be mounted for rotation in bearing means 156 of a cassette 158 to protect the film during non-use. The cassette cover 158a may be installed or removed during operation of the storage reel 128 in the projector. An aperture 160 formed in the cassette body 158b permits unimpeded movement of the film. As previously mentioned in conjunction with the cassette reels 32 and 34, the reels 118 and 128 driven for film-takeup purposes by engaging means of the projector, not shown, embody clutch or similarly functional means permitting their free rotation in directions opposite to those in which they are driven. As indicated by the arrows, the driven reel 128 and the freely rotating reel 118 are just commencing to rotate in a counterclockwise direction. A separable slit 161 enables film release.

Figure 6:
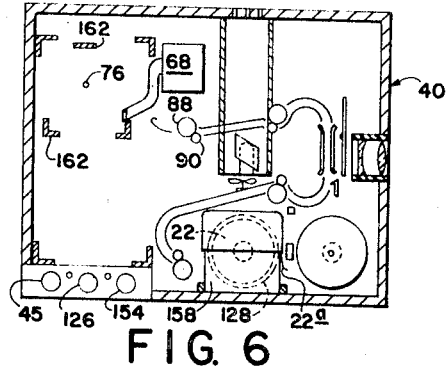
Figure 7:
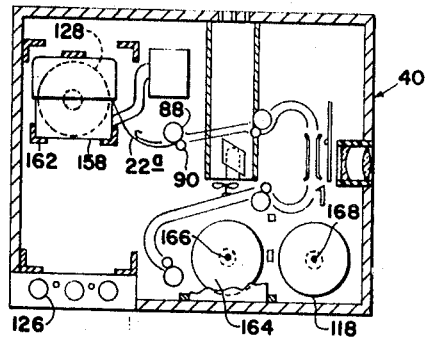

As illustrated in FIG. 6, the film 22 has been completely wound on the storage reel 128 and the knob 154 has been turned to a second "off" position terminating the taking up rotation of the storage reel. The cassette 158 may now be removed from the projector and stored, or the film may be rerun, as previously described, by mounting the cassette 158 in retaining means 162 placing a new reel 164 on the spindle 166 formerly occupied by reel 128, and manually threading the film leader 22a between the rollers 88 and 90. It may be assumed at this stage that the control knobs 45, 126 and 154 have been turned reversely to their initial "off" positions. FIG. 7 illustrates the mounting of cassette 158 in retaining means 162, threading of the film leader 22a between rollers 88 and 90 for subsequent advancement through the projector to the takeup reel 118 mounted on spindle 168. To commmence the projection operation, the control knob 126 is once again turned to actuate the relevant switching means.

Figure 12:
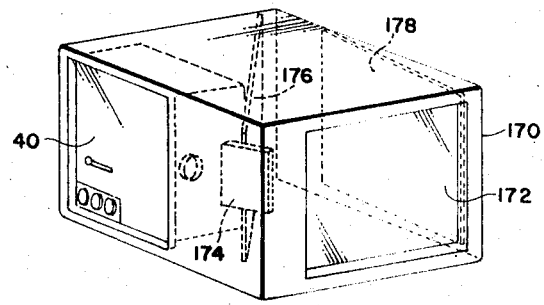
FIG. 12 is a diagrammatic perspective illustration of a complete unit of the invention.

In FIG. 12, the projector component 40 is illustrated mounted within an enclosure 170 embodying a rear-projection screen 172. The projected image is reflected by mirrors 174, 176 and 178, respectively, to the screen. The entire assembly forms a compact cabinet-type unit suitable for home use.

A certain degree of latitude is possible with respect to the categories of rapidly processable motion-picture film which may be employed in the system of the present invention. Composite film materials of the type contemplated, involving diffusion transfer processes and adapted to either black-and-white or full-color image formation, the latter through additive and subtractive techniques, are, for example, described in U. S. Pat. Nos. 2,614,926, 2,726,154, 2,944,894 and 3,087,815. Certain of the film structures and methods shown therein require the presence of a so-called spreader- or strip-sheet cooperating in juxtaposed relation with the film emulsion or with another layer for applying and distributing a processing liquid therebetween to permeate the liquid into the emulsion and to strip the emulsion away after formation of the desired image in another layer of the ultimate film transparency. Other of the examples permit application of a processing liquid directly to an outer layer of a film structure, e.g., to the photographically exposed film emulsion. This method of liquid application is described relative to the showing of FIG. 2, above. Another relevant process, not comprehended by the above-referenced patents and not strictly within the scope of a diffusion transfer method of image formation, involves a film structure comprising, in order of light transmission, a transparent support, a transparent color-screen, and a photosensitive emulsion. In this instance, a processing liquid may be applied directly to the emulsion wherein both negative and positive images are formed. The positive image is dominant to a degree rendering the negative image substantially invisible. This process of image formation may aptly be considered as occuring at the stage represented in FIG. 2.

Figure 13:
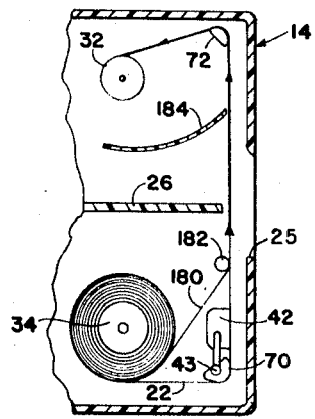
FIGS. 13, 14 and 15 are diagrammatic fragmentary views of internal modifications of the principal cassette of the invention showing various means identified with processing of the motion-picture film.

FIG. 13 illustrates a modification of the internal structure of the cassette 10 wherein a strip film 180 is employed in conjunction with the film 22, the latter having its photographically exposed emulsion on an inner surface, as previously described. In the example shown, the strip film 180 has previously been coiled, as in the camera of FIG. 1, in interleaved relation with the photographically exposed film 22 on the takeup reel 34. Assuming the cassette 14 to be mounted in the projector 40, as in FIG. 2, the processing liquid is applied to the film emulsion from the liquid-impregnated pad 42. The strip film 180 and the film 22 are brought together by the guide means 182 and are taken up on the supply reel or hub 32. The cassette is to be understood as additionally including the elements previously described, excepting, preferably, the vent 66, inasmuch as heat is not essential.

Figure 14:
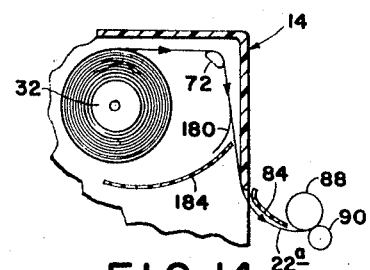

As shown in FIG. 14 which represents a stage comparable to that of FIG. 3, the trailing end of the film 22 is slightly longer than that of the strip-film 180. When rotation of reel 32 has ceased, as provided by actuation of the microswitch within guide 70, the film 22 and strip-film 180 have automatically assumed the positions illustrated. The superimposed end portions of the film 22 and strip-film 180 are pre-treated, as by a silicone coating or the like, whereby they will not adhere to one another following application of the processing liquid to the film emulsion and, preferably, will slightly curl in opposite directions, as shown. Accordingly, when the film leader 22a is inserted between the drive roller 88 and the pad roller 90, as previously described, the strip film is disposed to self-coiling, as facilitated by the guide 184, and is adapted to pull away the developed emulsion bearing, for example, an unwanted negative image, leaving the desired positive image formed within the motion-picture film transparency 22. As is well known in the art, a so-called strip coat may be provided between the film emulsion and a contiguous inner layer to facilitate removal of the emulsion with the strip film 180.

Figure 15:
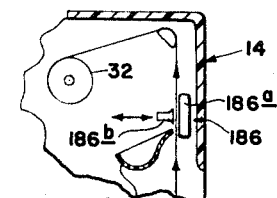

In FIG. 15, a modification of means for removing the still-moist negative emulsion from the film 22 after formation of a positive image on or within an internal image-receiving layer is illustrated. The device is in the form of a squeegee 186 including a fixed element 186a composed, for example, of a rigid plastic serving as a platen and a resilient element 186b composed of a rubber or synthetic rubber adapted to press against the emulsion and separate it from the underlying layer. The container 188 is positioned to receive fragments of the removed emulsion. The squeegee element is adapted to be moved away from the platen 186a, as by an external control knob connected therewith, to permit unimpeded return movement of the film for projection. The device of FIG. 15 may be employed in a cassette of the type previously mentioned, preferably exclusive of the heat-applying means.

Certain further modifications of the apparatus are possible within the compass of the invention. Thus, for example, the reel 32 may be adapted to engagement by backwinding means of the camera to permit its rotation therewithin in a direction opposite to that shown for the purpose of making lap dissolves. The cassette of FIG. 10 is merely exemplary. Other means for containing, releasing and applying the processing liquid and for actuating various elements will be apparent. The reels 32 and 34 of the cassette may be otherwise positioned, e.g., in separate halves thereof and even side-by-side provided that an accessible path of film movement for applying a processing liquid is provided.

Figure 4:
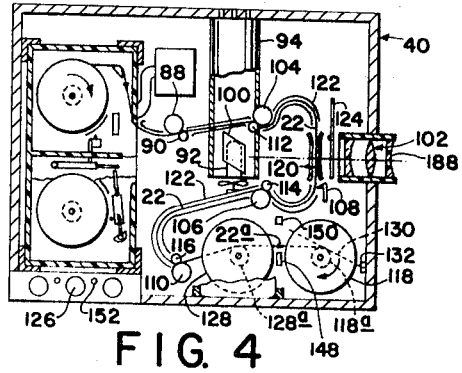

Among the film structures previously mentioned as adapted to the motion-picture film of the subject system are those embodying an additive color screen element used for color-separation purposes at the "taking" stage in the camera and to provide the several color components of the visible color image in conjunction with a black-and-white image reproduction in the ultimate motion-picture film. Because of the magnification involved in projection, the interstices or other linear components of the screen may normally be visible and detrimental. A prismatic element 188 for substantially reducing or eliminating the lines is shown in FIG. 4, positioned at the front of the projector lens tube. A prismatic element of the type contemplated is described in the copending U. S. Pat. application Ser. No. 702,243, filed Feb. 1, 1968 under the name of Stanley W. Haskell for "Method And Apparatus For Projecting A Scene."

The cassette 10 may be considered as of a disposable type or, for example, it may be returned to the manufacturer for reloading and subsequent sale as a new item.

Processing of the film, either within or externally of the cassette 10, subsequent to rewinding of the film on reel 32, is a possible alternative. In such a modification, the processing applicator or dispenser could, for example, be relocated adjacent to the reel 32. Application of the processing liquid to the film would then occur during the projection stage illustrated in FIG. 4. A further modification, applicable to the cassette shown, contemplates coiling the film on reel 32, in a still-wet condition and providing drying means therefor as it is taken off of reel 32 during the projection operation of FIG. 4. Another modification envisions the provision of a "carrying case" usable intermediate of the camera of FIG. 1 and the projector of FIG. 2, embodying means for performing the operations relative to the cassette shown in FIG. 2. Such a carrying case, in addition to a conventional transport function, would enable the processing of a large number of reels of film in the field, all of which would be in a condition for immediate projection upon return to a base.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A cassette comprising:
   an enclosed opaque housing configured to be first mounted in a camera to facilitate film exposure operations and subsequently in a projector to facilitate film processing and viewing operations;
   an unexposed strip of photographic material coiled within said housing;
   a film gate for access of light rays to selected incremental portions of said strip of material;
   first means responsive to drive means of such camera when said cassette is mounted therein for progressively advancing said unexposed strip of photographic material past said film gate while retaining said strip of photographic material entirely within said cassette to facilitate the recording of images thereon;
   a normally inoperative processing station adapted to being selectively rendered operable to apply processing fluid to said strip of material after exposure of said strip of material to image carrying light rays incident through said film gate;
   second means responsive to drive means of such projector when said cassette is mounted therein after exposure of said strip of photographic material for progressively advancing said strip of material through said processing station while retaining said strip of photographic material entirely within said cassette to facilitate the formation of visible images from said recorded images; and
   means for selectively rendering said processing station operable when said strip of material in an exposed condition is transported through said processing station by said second means.

2. The cassette of claim 1 additionally comprising a drying station within said cassette adapted to facilitate the removal of evaporable constituents of said processing fluid therefrom after the application of said fluid to said strip of photographic material.

3. A cassette supplied loaded with motion-picture film and adapted to rapid mounting in and removal from both a camera and projector comprising a housing having a film gate provided therein, spool means responsive to selective engagement with drive means of sad camera and projector to transport said film across said film gate, film processing means mounted within said housing; and means for selectively bringing said film processing means into operative relationship with said film as it is transported across said film gate by said spool means.

4. The cassette of claim 3 wherein said spool means are responsive to selective engagement with drive means of said camera and projector to reversibly transport said film across said film gate.

5. The cassette of claim 3 wherein a processing medium in a liquid state is applied to said film when said film processing means is brought into operative relationship with said film and additionally comprising a drying station within said cassette adapted to facilitate the removal of evaporable constituents of said processing medium therefrom after the application of said processing medium to said film.

6. A cassette supplied loaded with motion-picture film and adapted to rapid mounting in and removal from both a camera and projector comprising:
   a housing having a film gate provided therein;
   normally inoperative means for processing said film with a processing medium in a liquid state after exposure thereof mounted within said housing;
   spool means responsive to selective engagement with drive means of said camera and projector to transport said film across said film gate and said processing means;
   means for selectively rendering said processing means operable as said film is transported thereacross; and
   a drying station within said cassette adapted to facilitate the removal of evaporable constituents of said processing medium therefrom after the application of said processing medium to said film.

* * * * *